UNITED STATES PATENT OFFICE.

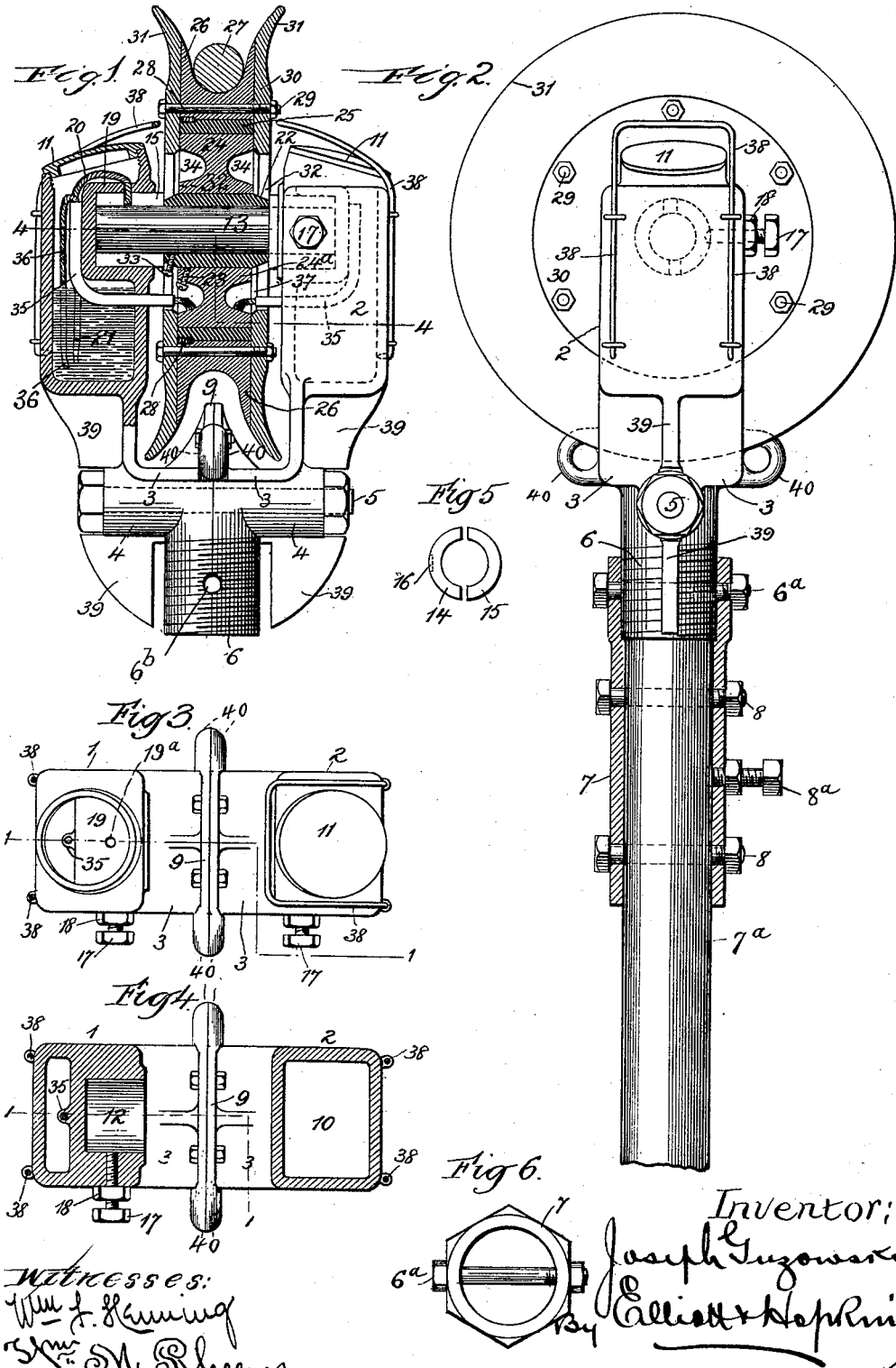

JOSEPH GUZOWSKI, OF CHICAGO, ILLINOIS.

TROLLEY.

SPECIFICATION forming part of Letters Patent No. 523,163, dated July 17, 1894.

Application filed January 13, 1893. Serial No. 458,250. (No model.)

*To all whom it may concern:*

Be it known that I, JOSEPH GUZOWSKI, a subject of the Emperor of Germany, residing at Chicago, in the county of Cook and State of Illinois, have invented certain new and useful Improvements in Trolleys, of which the following is a full, clear, and exact specification.

My invention relates to that class of trolleys more especially adapted for use on electric cars and the like, but my improvements are also applicable to trolleys for other purposes.

The improvements have more especial reference to the means for keeping the bearings or journals oiled and providing for the free rotation of the trolley-wheel in the event the ordinary journal thereof should become overheated and stick.

My improvements also have reference to the general construction of the trolley.

One of the objects of my invention is to provide the trolley-wheel with a number of bearings or journals so arranged that the wheel may rotate on either independently of the other and to automatically supply such bearings with a suitable lubricant. A further object is to provide for the ready removal of the trolley-wheel from the frame or bracket.

With these ends in view, my invention consists in certain features of novelty by which the said objects and certain other objects hereinafter described are attained, which features are shown in the drawings and hereinafter fully described in connection therewith and particularly pointed out in the claims.

In the said drawings,—Figure 1 is an elevation of my improved trolley, partly in section, on the line 1—1, Figs. 3 and 4. Fig. 2 is a side elevation thereof, showing the pole socket in section. Fig. 3 is a plan view, with the wheel and its pintle or journal removed. Fig. 4 is a plan section on the line 4—4, Fig. 1, the wheel being removed. Fig. 5 is a detail view of one of the bushings hereinafter described; and Fig. 6 is an end view of the pole socket.

Like signs of reference indicate like parts throughout the several views.

In carrying out my invention I employ a divisible bracket or frame, that is to say, a bracket or frame composed of separable sections, each of which is provided with an oil-chamber or receptacle, and between their opposing faces or sides is journaled the trolley-wheel, whose pintle and other bearings are automatically supplied with oil or lubricant from said chambers, the wheel itself being formed of a number of concentric rings and bushings, and the inner bushings being independently revoluble, whereby the wheel may rotate in the event the ordinary journal becomes overheated and sticks.

The frame or bracket of the trolley is constructed of two sections 1, 2, which may be substantially duplicates of each other. These sections 1, 2 may be provided with laterally projecting webs 3, on the under side of which are formed bosses 4, one on each section, which register with each other and through which passes a bolt 5 by means of which the sections may be securely clamped together. In order, however, that the sections may be more securely held against movement with relation to each other, each is provided below the bosses 4 with one-half of a threaded stem 6, upon which may be screwed a ferrule or socket 7 for the reception of the upper end of the pole 7ª by which the trolley is supported on the top of the car, the stem 6 being held from turning out of the ferrule or socket by means of a pin or bolt 6ª passing through the squared end of the ferrule and a hole 6ᵇ in the stem, and the pole being held in place in the socket or ferrule 7 by suitable pins or bolts 8 passing therethrough, a set-screw 8ª being provided for tightening the pole in its socket. The strength and rigidity of the frame or bracket may be still further added to by providing each of the webs 3 with upwardly projecting flanges 9 bolted together, as shown more clearly in Figs. 3 and 4.

Each of the sections 1, 2 of the frame or bracket is provided with an oil chamber or receptacle 10 having a removable screw cap or cover 11 by means of which the filling holes or openings may be closed.

The horizontal or lateral webs 3 hold the upper portions of the sections 1 and 2, in which the oil chambers are formed, at a distance from each other, whereby the trolley-wheel may be mounted between them, and the opposing or inner faces of these upper portions of the sections 1 and 2 are provided with sockets or recesses 12 arranged diametrically opposite each other for the reception of the pintle or shaft 13 upon which the trolley-wheel is mounted. The pintle or shaft 13, however, is preferably journaled at each end in a divided bushing consisting of two semi-circular rings 14, 15, as shown more clearly in Fig. 5, which are arranged or fitted within the recesses 12, and one of which is provided with a cavity or socket 16, into which engages the inner end of a set-screw 17 threaded in the side of each section of the bracket and adapted to crowd one section of each bushing against the journal or pintle 13 and thus hold it in contact with the other sections of the bushing for compensating for wear between the parts. Each of the set-screws 17 may, if desired, be provided with a lock-nut 18 for holding them up to their adjustment. The upper side 19 of each of the recesses 12 is provided with a perforation 19$^a$ through which passes the upper end of a wick 20, whose lower end 21 dips into the oil in the chamber 10 and feeds the same by capillary attraction to the end of the journal or shaft 13, the upper end of the wick 20 being arranged between the sections 14, 15 of the divided bushing so as to be in contact with the revolving journal, whose motion will accelerate the flow of the oil.

The divided bushings consisting of the sections 14, 15 are preferably composed of soft steel, while the journal or pintle 13 is composed of tool-steel; but while these substances are desirable for the sake of reducing the friction, it will nevertheless be understood that any other well known combination of metals or materials for bearings will be within the spirit of my invention.

The ends of the sections 14, 15 are preferably of such length as to project slightly beyond the inner faces or walls of the sections 1 and 2 so as to come against a bushing or sleeve 22 mounted upon the pintle or journal 13 and forming a part of the trolley-wheel and thus limit or prevent the end thrust or axial movement of the wheel. Mounted revolubly upon this sleeve 22 and being detachably secured thereto by means of a screw or pin 23 is a bushing 24 which, when detached from the sleeve 22, constitutes an independent bearing for the wheel upon which it may revolve. This bushing 24 is surrounded by a ring 25, which latter is surrounded by an exterior ring 26 having a grooved periphery for the reception of the conductor or wire 27, the rings 25, 26 being secured together by any suitable means such as the keys or dowels 28 arranged in sockets or cavities formed in the meeting surfaces of such rings. The outer ring 26 is secured by means of bolts or rivets 29 to two circular side plates or disks 30 whose outer edges are out-turned, as shown at 31, and form extensions or side flanges to the groove of the ring 26 for preventing the wheel from slipping off the wire.

The side plates 30 are provided with central openings 32 which form annular spaces around the journal 13 and the end of the sleeve 22, and such sleeve is of sufficient length to project slightly beyond the edge of the bushing 24, whereby a set-screw 33 may be driven through the sleeve in such a manner as to impinge the journal 13 for causing the two parts to rotate in unison, while the bushing 24 is provided in each side or face with an annular recess or groove 34 which forms a hub-like portion 24$^a$, through one end of which the screw 23 is driven in such a manner that its inner end will impinge the sleeve 22. With this construction it will be seen that access to the set-screws 23, 33 may be had through the opening 32 in one side of the wheel when it is desired to loosen either the bushing 24 or the sleeve 22; but a further purpose of these openings 32 is to admit the lower ends of oil ducts or pipes 35 leading from the oil chambers 10, and a further purpose of the annular grooves 34 is to accommodate the protruding ends of wicks 36 dipping into the oil chambers 10 and passing through the tubes 35, their protruding outer ends being so arranged as to rub against the bushing 24 where it touches the side plates 30, whereby the flow of the oil or lubricant will be accelerated by the motion of the bushing, and the oil, as it leaves the wick, will collect on the lower sides of the grooves 34 and work its way between the bushing and the side plates and diffuse itself over the periphery of the bushing where it rubs against the ring 25. To the end that the oil may collect at the intersection of the bushing 24 and each of the side plates, I provide each of such plates around the inner side or edge of its opening 32 with a bevel 37, which will form a slight groove or channel in each side of the wheel, as shown in Fig. 1.

In order that the oil may not feed too freely through the wick 36, I carry the ends of the pipes or ducts 35 upward in the oil chambers to a point considerably above the ordinary level of the oil, whereby the flow of oil along the wick will be purely siphonic and its wastage through the pipe or duct when the wick is withdrawn for any purpose will be avoided.

The rings and bushings of which the trolley-wheel is composed are formed alternately of steel and bronze, such as aluminum bronze, or brass, or any other alloy which forms a good bearing surface for steel, the sleeve 22 being formed of the alloy, the bushing 24 of steel or other hard metal, the ring 25 of the alloy whereby the bushing 24 will have a proper bearing surface at its outer side or periphery in the event the wheel should rotate around such bushing, while the ring 26 may be formed of either steel or an alloy, but preferably of hardened steel in order that it may better withstand the friction of the wire or conductor, the side portions of its groove being of sufficient extent to protect the side flanges 31 of the plates 30 and thereby avoiding the necessity of composing the side flanges 31 of the plates 30 of steel.

It will now be seen that with a trolley constructed according to my invention the wheel is always at liberty to revolve upon the bushing 24 should the journal 13 stick from overheat or from any other cause. So also by loosening the screws 23, 33, the sleeve 22 may be permitted to turn on the journal 13 or the bushing 24 allowed to turn on the said sleeve. Each of the sections 1, 2 is provided with a wire-guard 38, which is preferably magnetized and which projects over the opening or space between the side of the wheel and the inner side of the section, for preventing the wire or conductor wedging between the wheel and the bracket or frame on either side in the event it should slip off of the wheel, or in the event the wheel should miss the wire when elevated by the operator. The lower side of each section 1, 2 is also provided with a curved web 39, which has two sections, as shown in Figs. 1 and 2, arranged flush with the outer ends of the nuts on the bolt 5, the lower sections of such webs tapering gradually down to the sleeve or ferrule 7, whereby the wire or conductor will be prevented from catching upon either side of the bosses 4 or bolt 5, or on the under sides of the oil chambers 10. A space 39ª between the stem and webs 39 is left for the reception and rotation of the end of the ferrule 7.

Each of the sections 1, 2, on both sides, may be provided with an eye 40 which eyes fit together, as shown, and form a single eye on each side for the attachment of the motor wire and trolley rope respectively.

Having described my invention, what I claim as new therein, and desire to secure by Letters Patent, is—

1. In a trolley, the combination with a frame or bracket and a shaft or pintle journaled therein, of a trolley wheel having a concentric independently revoluble portion 24 provided with grooves 34, the sleeve 22 arranged on said pintle and projecting beyond the side of the portion 24, a screw passing through the end of said sleeve and impinging said pintle and a screw arranged in said groove and passing through the portion 24 for securing it to the sleeve 22, substantially as set forth.

2. In a trolley, the combination of a divisible frame or bracket, the sections of which are provided in their opposed surfaces with recesses or sockets 12, contractible bushings located in said recesses or sockets, a screw passing through each of said sections for adjusting said bushings, and a wheel having its journal mounted in said bushings, substantially as set forth.

3. In a trolley, the combination of a divisible frame or bracket, the sections of which are provided in their opposed faces with recesses or sockets 12 and oil chambers, divided bushings located in said recesses or sockets, and wicks leading from said oil chambers and having their ends arranged between the sections of said bushings, substantially as set forth.

4. In a trolley, the combination with a frame or bracket having an oil chamber, of a wheel journaled in said frame or bracket and having side plates and an independently revoluble bushing between said plates provided in its side with a recess or groove, a tube or duct extending from said oil chamber to said bushing, and a wick dipping into said oil chamber and extending through said tube or duct and having its end arranged in said recess or groove, substantially as set forth.

5. In a trolley, the combination with a frame or bracket having an oil chamber, of a wheel journaled in said frame or bracket, and having side plates provided with central bevel edged openings, an independently revoluble bushing arranged between said plates, a tube or duct extending from the upper part of said oil chamber above the oil level, and a wick dipping into the oil chamber and extending through said tube or duct for supplying oil to said bushing, substantially as set forth.

6. In a trolley, the combination with a frame or bracket having an oil chamber, of a wheel journaled in said frame or bracket and having an annular opening in its side and being provided with an independently revoluble bushing having an annular recess opposite said opening, the edges of said annular opening in the side of the wheel, extending over the edges of the annular recess in the bushing, a tube projecting into said annular opening, and a wick passing through said tube from the oil chamber and extending into said annular recess, substantially as set forth.

7. In a trolley, the combination with a frame or bracket and a journal mounted therein, of a wheel mounted on said journal and having circular side plates provided with open spaces around said journal, the annular exteriorly grooved ring 26 secured to said side plates, a sleeve mounted on said journal, an independently revoluble bushing surrounding said sleeve and arranged between said side plates, and means for securing said sleeve and bushing together, arranged to be accessible through one of the openings in said side plates, substantially as set forth.

8. In a trolley, the combination with a frame or bracket and a journal mounted therein, of a wheel mounted on said journal and having circular side plates having the central openings 32, the ring 26 secured to said side pieces, the independently revoluble bushing 24 having annular recesses arranged opposite said openings 32, the sleeve 22 mounted upon the journal within the bushing 24, a set screw passing through the sleeve 22 and impinging the journal and having its head arranged in one of the openings 32, and a second set screw passing through a portion of the bushing and impinging said sleeve and having its head arranged in one of said annular recesses, substantially as set forth.

9. In a trolley, the combination with a frame or bracket having an oil chamber, of a trolley wheel journaled in said bracket and having an opening 32 in its side, and an independently revoluble bushing provided with an annular recess opposite said opening, the intersection of said bushing and the side of said opening being provided with a groove, and a wick leading from said oil chamber and projecting into said groove, substantially as set forth.

10. In a trolley, the combination with a wheel, of detachable sections in which said wheel is mounted, and a bolt for securing said sections together, said sections having the guard webs 39 arranged flush with and extending from the ends of said bolt, substantially as set forth.

11. In a trolley, the combination with a wheel having a journal, of a frame having enlargements on its sides in which said journal is mounted and a pole secured to said frame, said frame having guard webs extending between said enlargements and said pole, substantially as set forth.

12. In a trolley, the combination with a trolley frame or bracket having a pintle journaled therein, a sleeve journaled on said pintle, a bushing journaled on said sleeve, a ring journaled upon said bushing, an outer ring mounted upon and secured to said first ring, and side plates having central openings, secured to said outer ring and holding said bushing in place, substantially as set forth.

JOSEPH GUZOWSKI.

Witnesses:
F. A. HOPKINS,
EDNA B. JOHNSON.